(12) United States Patent
Kwak et al.

(10) Patent No.: US 10,200,958 B2
(45) Date of Patent: Feb. 5, 2019

(54) METHOD AND APPARATUS FOR CONTROLLING TRANSMISSION POWER OF TERMINAL IN MOBILE COMMUNICATION SYSTEM

(71) Applicant: Samsung Electronics Co., Ltd., Suwon-si, Gyeonggi-do (KR)

(72) Inventors: Hyochul Kwak, Hwaseong-si (KR); Eunjung Kim, Suwon-si (KR); Heewon Kang, Seongnam-si (KR); Myungkwang Byun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/550,188

(22) PCT Filed: Feb. 25, 2016

(86) PCT No.: PCT/KR2016/001853
§ 371 (c)(1),
(2) Date: Aug. 10, 2017

(87) PCT Pub. No.: WO2016/137244
PCT Pub. Date: Sep. 1, 2016

(65) Prior Publication Data
US 2018/0035388 A1    Feb. 1, 2018

(30) Foreign Application Priority Data
Feb. 25, 2015  (KR) .................. 10-2015-0026688

(51) Int. Cl.
*H04W 52/24*    (2009.01)
*H04W 52/12*    (2009.01)
(Continued)

(52) U.S. Cl.
CPC ......... *H04W 52/241* (2013.01); *H04W 24/08* (2013.01); *H04W 52/12* (2013.01);
(Continued)

(58) Field of Classification Search
CPC ... H04W 52/241; H04W 24/08; H04W 52/12; H04W 88/08
See application file for complete search history.

(56) References Cited

U.S. PATENT DOCUMENTS 5,748,687 A    5/1998  Ozluturk
7,167,719 B2   1/2007  Agin
(Continued)

FOREIGN PATENT DOCUMENTS

EP    1 124 340 A1    8/2001
JP    4595629 B2      8/2010
(Continued)

OTHER PUBLICATIONS

Gang Luo et al., Dynamic Rate Assignment and Power Control in Uplink UMTS W-CDMA Systems, May 1, 2006.
European Search Report dated Dec. 6, 2017, issued in European patent application No. 16755894.9.

*Primary Examiner* — Afshawn M Towfighi
(74) *Attorney, Agent, or Firm* — Jefferson IP Law, LLP

(57) ABSTRACT

In order to solve a problem in which when a terminal is converted from an active state of transmitting data to an inactive state, the transmission power of the terminal rapidly increases, a base station can control the transmission power by predicting and reflecting, in a target SIR, a decrease in SIR which results from an increase in interference amount due to data transmission of another terminal. The present invention can ensure the quality of an uplink control channel by controlling power in consideration of the effect of interference, even when the terminal is in an inactive state.

8 Claims, 6 Drawing Sheets

(51) Int. Cl.
    *H04W 52/26* (2009.01)
    *H04W 52/36* (2009.01)
    *H04W 24/08* (2009.01)
    *H04W 52/28* (2009.01)
    *H04W 52/44* (2009.01)
    *H04W 52/48* (2009.01)
    *H04W 88/08* (2009.01)

(52) U.S. Cl.
    CPC ........... *H04W 52/24* (2013.01); *H04W 52/26* (2013.01); *H04W 52/267* (2013.01); *H04W 52/287* (2013.01); *H04W 52/36* (2013.01); *H04W 52/44* (2013.01); *H04W 52/48* (2013.01); *H04W 88/08* (2013.01)

(56) References Cited

U.S. PATENT DOCUMENTS

| | | | |
|---|---|---|---|
| 2010/0041427 A1 | 2/2010 | Hannu et al. | |
| 2010/0105407 A1* | 4/2010 | Demaj | H04W 52/12 455/453 |
| 2010/0227563 A1 | 9/2010 | Nibe | |
| 2013/0044662 A1 | 2/2013 | Kwon et al. | |
| 2013/0225225 A1 | 8/2013 | Perrson et al. | |

FOREIGN PATENT DOCUMENTS

| | | |
|---|---|---|
| JP | 2011-530952 A | 12/2011 |
| KR | 10-2005-0053646 A | 6/2005 |
| WO | 2009/084091 A1 | 7/2009 |
| WO | 2011/059279 A2 | 5/2011 |

\* cited by examiner

METHOD AND APPARATUS FOR CONTROLLING TRANSMISSION POWER OF TERMINAL IN MOBILE COMMUNICATION SYSTEM

TECHNICAL FIELD

The present invention relates to a method and an apparatus for controlling transmission power of a terminal in a mobile communication system, and more particularly, to a method and an apparatus for controlling transmission power of a terminal that rapidly increases in an inactive period.

BACKGROUND ART

In a wideband code division multiple access (W-CDMA) system, a total received uplink power in a cell is controlled not to exceed a limited specific value that is expressed by a rise over thermal (RoT) (total interference to thermal noise ratio that is used to measure how much a cell is congested). This is to secure the communication quality of a terminal existing on a cell boundary, and transmission power of a terminal is an important factor to determine the degree of uplink interference that influences another terminal.

As a power control method based on a general signal to interference ratio (SIR), inner loop power control is provided. This is for a base station to command a terminal to increase or decrease a power using a transmit power control (TPC) command that is transmitted in the unit of time slot through comparison of an SIR measured mainly using a dedicated physical control channel (DPCCH) with a target SIR. A terminal receives the TPC command transmitted by the base station, and operates to increase or decrease the transmission power (mixedly used with power) of the terminal.

In this case, the target SIR is adjusted by outer loop power control, and this is affected by a block error rate (BLER) of a data channel. That is, if a positive acknowledgement (ACK) for the transmitted data is received, the base station decreases the target SIR, whereas if a negative acknowledgement (NACK) is received, the base station increases the target SIR. Since the target SIR as described above is updated only in a data transmission period (mixedly used with active period or active state), the last target SIR value of the previous data transmission period is maintained as it is in a data non-transmission period (mixedly used with inactive period or inactive state).

DISCLOSURE OF INVENTION

Technical Problem

However, when a terminal is switched from an active state to an inactive state, in particular, as a data transmission rate becomes higher, the transmission power of the terminal increases rapidly, and it is necessary to control this. Accordingly, there is a need for a method for controlling such rapid increase of the transmission power of the terminal in an inactive state.

Solution to Problem

In one aspect of the present invention, a method for a base station to control transmission power of a terminal includes measuring a signal to interference ratio (SIR) of the terminal; determining whether a transmission period is an active period in which data is transmitted or an inactive period otherwise; calculating a data transmission rate in the active period of the terminal if the transmission period is the inactive period; and determining an offset to be applied to a target SIR based on the data transmission rate.

In another aspect of the present invention, a base station for controlling transmission power of a terminal includes a transceiver configured to transmit and receive signals with the terminal; and a controller configured to measure a signal to interference ratio (SIR) of the terminal, to determine whether a transmission period is an active period in which data is transmitted or an inactive period otherwise, to calculate a data transmission rate in the active period of the terminal if the transmission period is the inactive period, and to determine an offset to be applied to a target SIR based on the data transmission rate.

Advantageous Effects of Invention

In accordance with the method for controlling the transmission power of the terminal according to an embodiment of the present invention, cell throughput can be increased through prevention of rapid increase of the transmission power of the terminal.

MODE FOR THE INVENTION

Figure 1A:
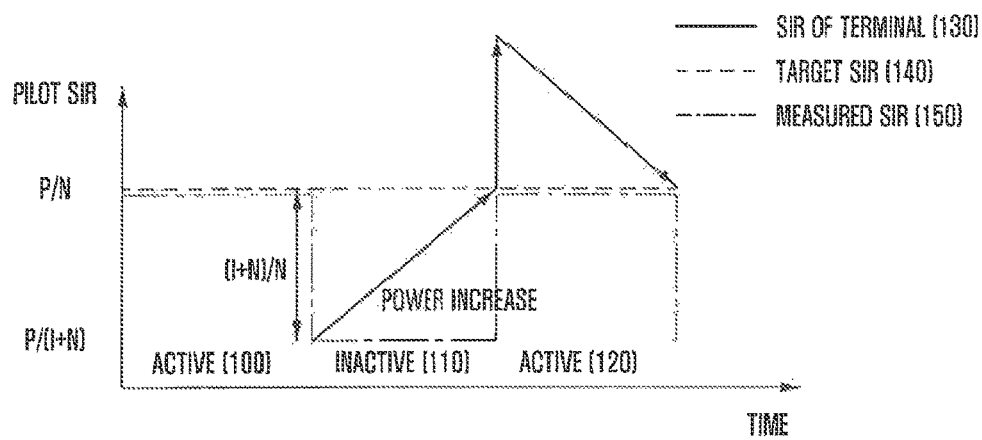
FIG. 1A is a diagram illustrating a target SIR of a terminal that is switched from an active period to an inactive period and measured SIR.

Hereinafter, embodiments of the present invention will be described in detail with reference to the accompanying drawings. In describing the present invention, related well-known functions or configurations incorporated herein are not described in detail in the case where it is determined that they obscure the subject matter of the present invention in unnecessary detail. Further, terms to be described later are terms defined in consideration of their functions in the present invention, but may differ depending on intentions of a user and an operator or customs. Accordingly, they should be defined based on the contents of the whole description of the present invention.

In describing embodiments of the present invention in detail, although a code division multiple access (CDMA)

based wireless communication system, in particular, the universal division multiple access (UMTS) standard, will be the primary subject, the main gist of the present invention can be applied to other communication systems having similar technical backgrounds and channel types with slight modifications within a range that does not greatly deviate from the scope of the present invention, by the judgment of those skilled in the art to which the present invention pertains.

The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures.

In this case, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "~unit", as used in an embodiment, means, but is not limited to, a software or hardware component, such as FPGA or ASIC, which performs certain tasks. However, "~unit" does not mean to be limited to software or hardware. The term "~unit" may advantageously be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "~units" may be combined into fewer components and "~units" or further separated into additional components and "~units". Further, the components and "~units" may be implemented to operate one or more CPUs in a device or a security multimedia card.

Figure 1B:
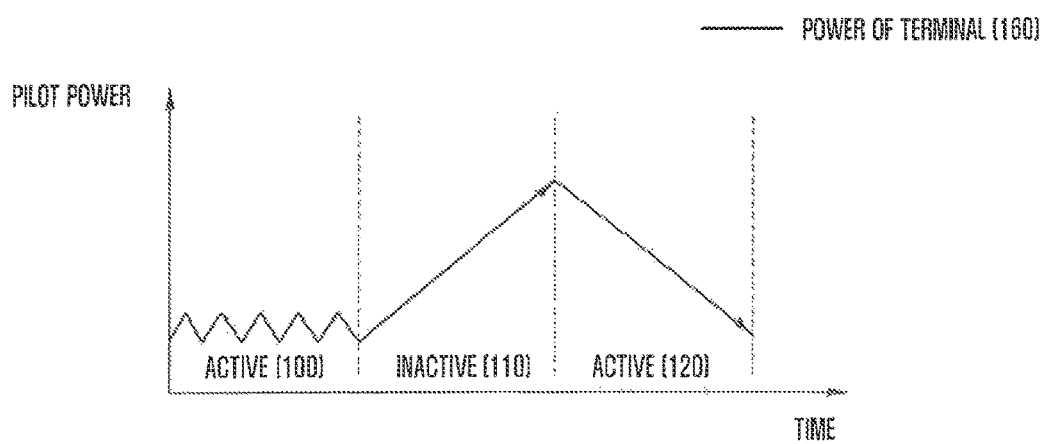
FIG. 1B is a diagram illustrating transmission power of a terminal that is switched from an active period to an inactive period.

FIGS. 1A and 1B are diagrams illustrating a phenomenon in which power is rapidly increased in an inactive state of a terminal.

In the case of using an inner loop power control method in the related art, such as time division scheduling, a problem may occur when a specific terminal is allocated with most resources of a specific transmission time interval. If a terminal transmits data at high data transmission rate, the degree of interference between an active period and an inactive period is changed rapidly, and thus transmission power of the terminal is increased rapidly.

FIG. 1A is a diagram illustrating a target SIR of a terminal that is switched from an active period to an inactive period and measured SIR. Referring to FIG. 1A, when the terminal is switched from an active state (data transmission) 100 to an inactive state (data non-transmission) 110, a target SIR 140 is maintained as it is in the active state. Since the target SIR in the active state corresponds to a case where another terminal does not transmit data, it may be expressed as P/N (where, P denotes a pilot power of the corresponding terminal, and N denotes noise). However, if the corresponding terminal is switched to the inactive state, this corresponds to a case where the other terminal transmits data, and in this case, interference that the other terminal exerts on the subject terminal is increased rapidly. Accordingly, the SIR 150 measured by a base station is lowered to P/(N+I) (where, I denotes the total power of the other terminal that corresponds to an interference amount that the other terminal exerts on the subject terminal). In this case, the base station determines that the target SIR is lower than the measured SIR, and transmits to the terminal a TPC command for indicating the terminal to continuously increase the transmission power. The terminal that has received the TPC command transmitted by the base station continuously increases the transmission power, and thus the SIR 130 of the terminal is heightened. In this case, since the base station transmits the TPC command for indicating the terminal to increase the transmission power more frequently as the terminal transmits data at high data transmission rate in an active state, the transmission power of the terminal is rapidly increased to cause a problem. If the terminal is switched again to the active period 120, the measured SIR is higher than the target SIR, and thus the base station transmits to the terminal a TPC command for indicating the terminal to continuously decrease the transmission power. Accordingly, the terminal receives the TPC command transmitted by the base station, and continuously decreases the transmission power.

FIG. 1B is a diagram illustrating transmission power of a terminal that is switched from an active period to an inactive period. Referring to FIG. 1B, when the terminal is switched from an active state (data transmission) 100 to an inactive state (data non-transmission) 110, it continuously receives the TPC command for increasing the transmission power from the base station, and thus the transmission power 160 of the terminal is increased. The transmission power of the terminal becomes largest when the terminal is switched from the inactive state to the active state 120, and it is decreased after the terminal is switched to the active state.

Figure 2:
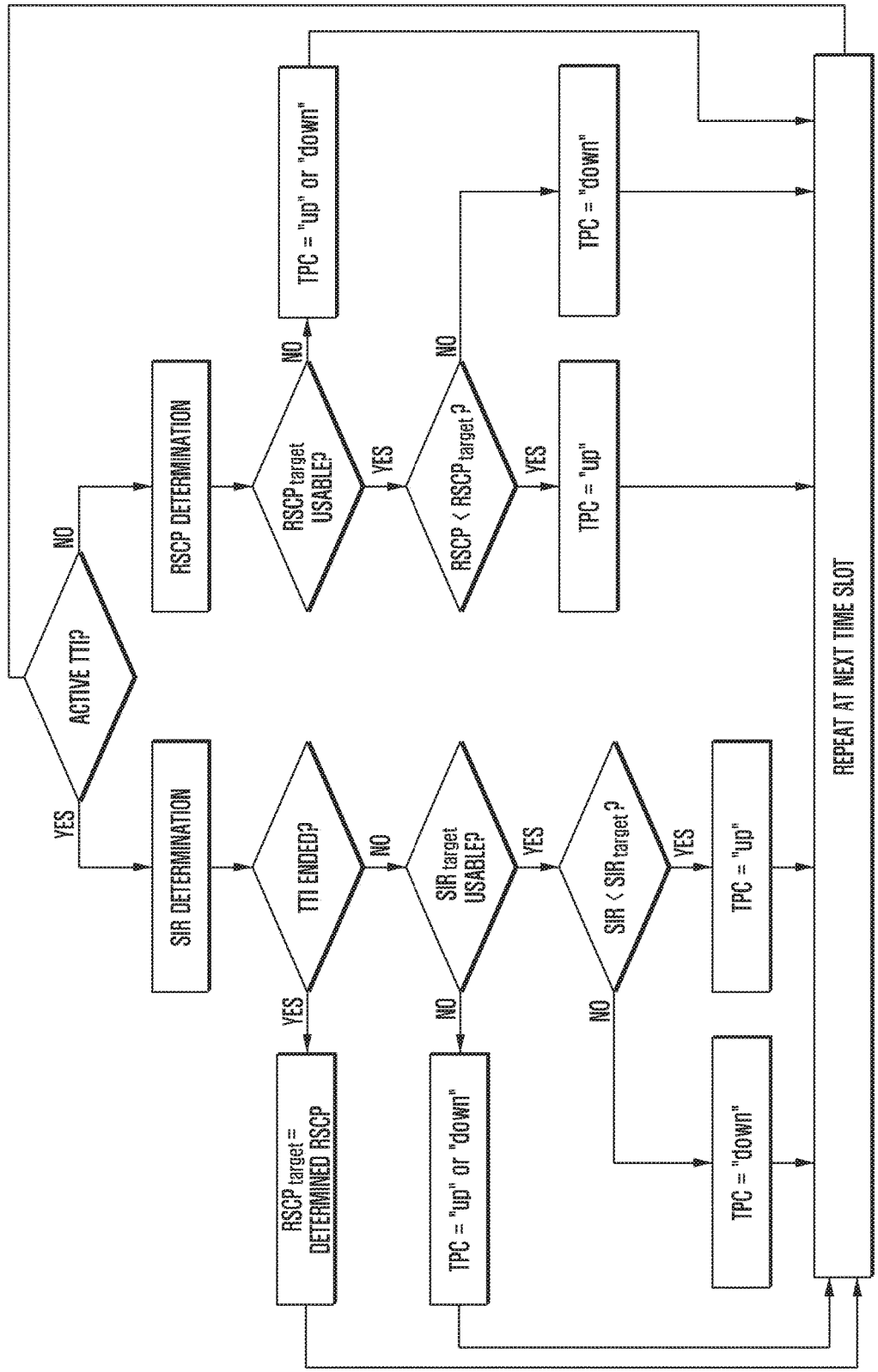
FIG. 2 is a diagram illustrating a method in the related art to solve the problem of rapid increase of transmission power in an inactive state of a terminal.

FIG. 2 is a diagram illustrating a method in the related art to solve the problem of rapid increase of transmission power in an inactive state of a terminal.

Referring to FIG. 2, a base station first determines whether a terminal is in an active state or an inactive state in a corresponding TTI. If the terminal is in an active state, SIR based power control is performed using a target SIR as in the method in the related art, whereas if the terminal is in an inactive state, power based power control is performed through new setting of target transmission power. That is, if the terminal is put in the inactive state, the pilot power or RoT in the previous active state is set as the target power.

This is a power control method through comparison of the current power with the target power regardless of interference in the inactive state, and in order to solve the problem that the transmission power of the terminal is rapidly increased in the inactive state, the power of the terminal that has satisfied the communication quality is maintained as it is even in the inactive state.

However, according to the related art technology of FIG. 2, it is necessary to switch a power control mode based on the SIR or the power depending on whether the terminal is in the active state or the inactive state, and it is necessary to additionally implement a function of managing and controlling the target power value for the power based power control mode. Further, since the power based power control method does not consider interference at all, it is not possible to overcome rapid increase of the interference exerted on the terminal in the corresponding cell or another cell, and in particular, it is not possible to prevent performance deterioration of an uplink control channel transmitted in the inactive state.

Accordingly, the present invention proposes a method for solving the problem of the rapid increase of the transmission power of the terminal while maintaining the SIR based power control method regardless of whether the terminal is in the active state or the inactive state. According to the present invention, since the terminal performs the SIR based power control even if the terminal is in the inactive state, the power control is performed in consideration of the interference, and thus the quality of the uplink control channel can be secured.

Figure 3A:
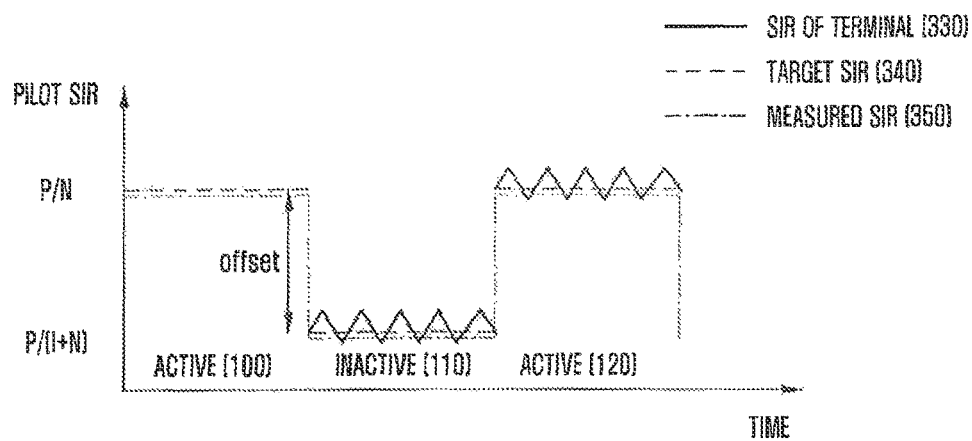
FIG. 3A is a diagram illustrating a target SIR of a terminal that is switched from an active period to an inactive period and measured SIR according to a method according to the present invention.
Figure 3B:
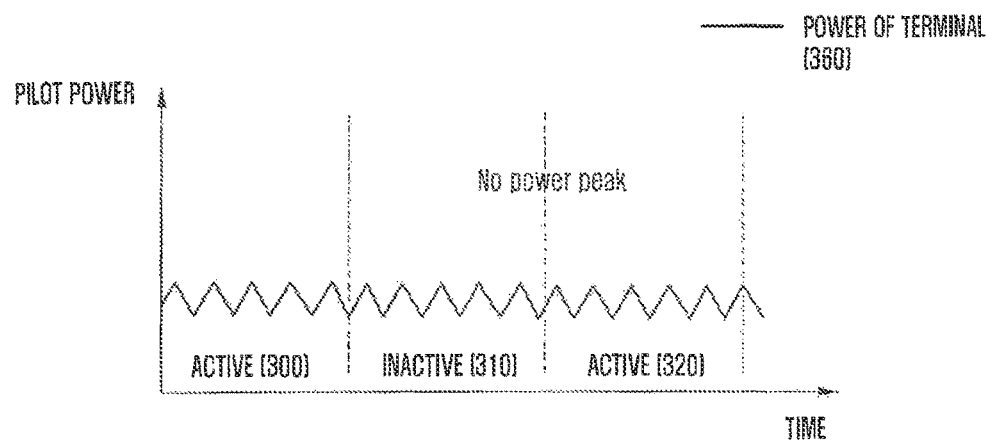
FIG. 3B is a diagram illustrating transmission power of a terminal that is switched from an active period to an inactive period.

FIGS. 3A and 3B are diagrams explaining a method for controlling SIR based power in an inactive state of a terminal.

The present invention provides a method in which when a terminal is switched from an active state to an inactive state, SIR deterioration according to an increase of an interference amount due to data transmission of another terminal is predicted, and transmission power is controlled through reflection of the SIR deterioration in a target SIR. If it is assumed that an SIR in an active state is SIR_act=P/N, the SIR in an inactive state becomes SIR_inact=P/(N+1) due to the interference exerted by another terminal. Accordingly, when the terminal is switched from the active state to the inactive state, it may be expected that a deterioration amount of the SIR is SIR_act−SIR_inact=(I+N)/N (calculated by dB scales), and this can be derived with reference to the link performance of the corresponding data rate. That is, the SIR deterioration amount (I+N)/N may be expressed as 1+necessary Ec/No (Necessary Ec/No is Ec/No that is necessary to satisfy the quality of the corresponding data rate. Ec is a received signal code power that is expressed by energy per chip, No denotes noise density of a band, and Ec/No means received energy per chip divided by a noise density in a band).

Accordingly, the target SIR_inact when the terminal is in the inactive state may be determined by applying an offset as much as an expected SIR deterioration amount to the target SIR_act. As described above, through expectable offset based SIR setting, the base station can solve the problem of the rapid increase of the transmission power of the terminal, and can perform stable power control. Further, even if the interference from the corresponding cell or another cell is rapidly increased when the terminal is in the inactive state, the base station performs power control through the target SIR_inact in which the interference amount is reflected, and thus can secure the minimum quality for the uplink control channel.

FIG. 3A is a diagram illustrating a target SIR of a terminal that is switched from an active period to an inactive period and measured SIR according to a method according to the present invention. According to FIG. 3A, when the terminal is switched from an active state (data transmission) 300 to an inactive state (data non-transmission) 310, a target SIR 340 is decreased from P/N to P/(I+n). Since the measured SIR 350 also maintains a value that is similar to the target SIR, the transmission power is maintained without rapid increase of the SIR 330 of the terminal. If the terminal is switched again to the active period 320, the target SIR is increased to P/N, and since the measured SIR also maintains a value that is similar to the target SIR, the transmission power of the terminal is controlled according to the TPC command transmitted by the base station.

FIG. 3B is a diagram illustrating transmission power of a terminal that is switched from an active period to an inactive period. When the terminal is switched from an active period 300 to an inactive period 310, the power 360 of the terminal continuously maintains a similar level.

Figure 4:
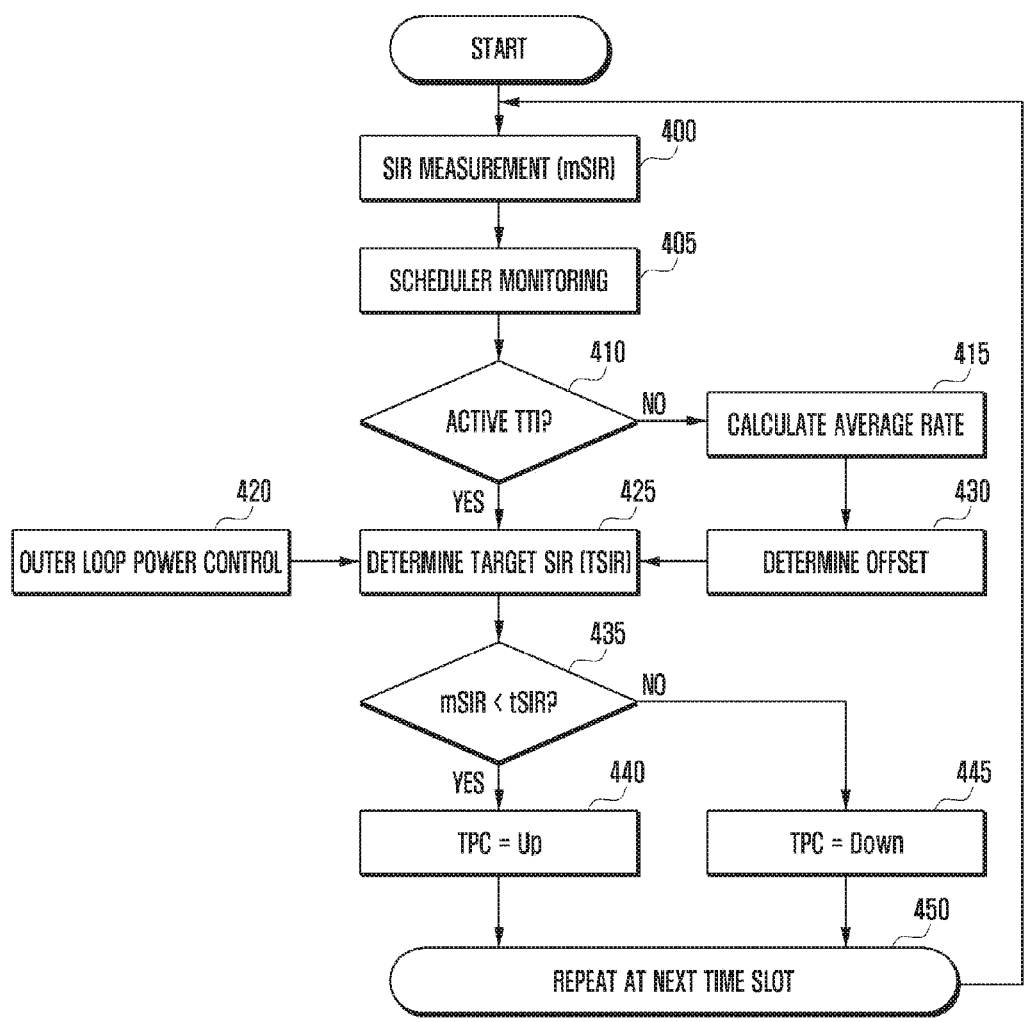
FIG. 4 is a diagram illustrating a method for performing SIR based power control according to the present invention.

FIG. 4 is a diagram illustrating a method for performing SIR based power control according to the present invention.

Referring to FIG. 4, a base station measures an SIR in the unit of a time slot from a pilot channel transmitted by a terminal. The SIR measured as above is called mSIR (400). The base station monitors a scheduler (405), and determines whether the terminal is in an active state or in an inactive state in the current TTI (410). In this case, if a resource is not allocated to the corresponding terminal or a resource that is equal to or smaller than a specific value is allocated to the terminal, the base station determines that the terminal is in the inactive state. If the terminal is in the active state, the base station determines a target SIR tSIR (425) through outer loop power control (420). If the terminal is in the inactive state, the base station calculates an average data rate transmitted by the terminal in the active state (415). The base station determines an offset for determining the target SIR in the inactive state based on the average data rate of the terminal (430). The base station expects Ec/No that is necessary to satisfy the quality of the transmitted data rate, and determines the offset by calculating the offset as 1+necessary Ec/No. Accordingly, the offset values can be mapped in accordance with the average data rate of the resource allocated to the terminal in the active state, and this can be simply implemented by a table. The base station determines the target SIR tSIR based on the determined offset (425). The base station determines whether the determined target SIR is higher than the measured SIR (435), and if the target SIR is higher than the measured SIR, the base station transmits a TPC command for indicating the terminal to increase the transmission power (440), whereas if the target SIR is lower than the measured SIR, the base station transmits a TPC command for indicating the terminal to decrease the transmission power to the terminal (445). The terminal adjusts the transmission power in accordance with the received TPC command. The above-described process is repeated in the next time slot (450).

Figure 5:
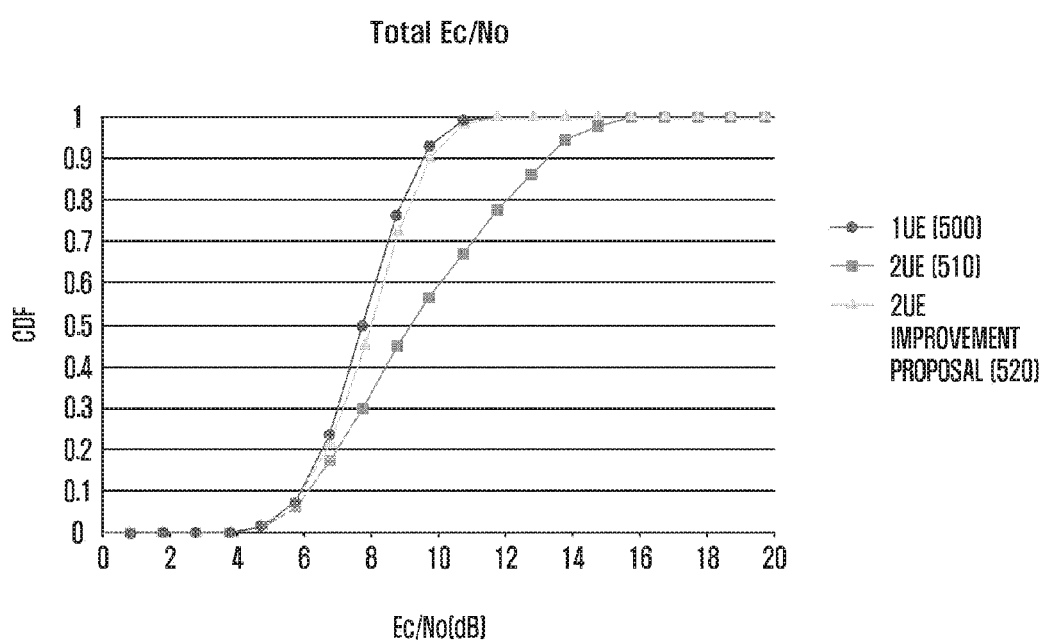
FIG. 5 is a diagram illustrating an accumulated distribution function of Ec/No when two terminals perform cross-transmission in an active/inactive state at a specific data rate.

FIG. 5 is a diagram illustrating an accumulated distribution function of Ec/No when two terminals perform cross-transmission in an active/inactive state at a specific data rate (E-DCH transport format combination indication (E-TPCI) 119, 4 Mbps).

According to the present invention, the problem of a rapid increase of a power in an inactive state can be solved, and the cell capacity can be improved. In particular, higher improvement effects can be expected in the case where the terminal is separated into an active state and an inactive state through time division scheduling and data is transmitted at high data rate.

Referring to FIG. 5, 1UE 500 indicates the result of transmission by one terminal in an active state. As compared with this as a reference, 2UE 510, which corresponds to the power control method in the related art when two terminals perform cross-transmission in an active/inactive state, indicates a case where the Ec/No value is excessively heightened due to the rapid increase of the transmission power of the terminal as compared with 1UE. 2UE improvement proposal 520 indicates a case where the power control according to the present invention is applied when two terminals perform cross-transmission in an active/inactive state, and in this case, the Ec/No distribution similar to that of 1UE is shown. Accordingly, it can be confirmed that the present invention can solve the problem of the rapid increase of the transmission power of the terminal.

According to the present invention, if RoT, which corresponds to an environment in which a cell load is 90% and high data rate can be allocated, is 10 dB, an effect of 11% throughput increase can be obtained.

Figure 6:
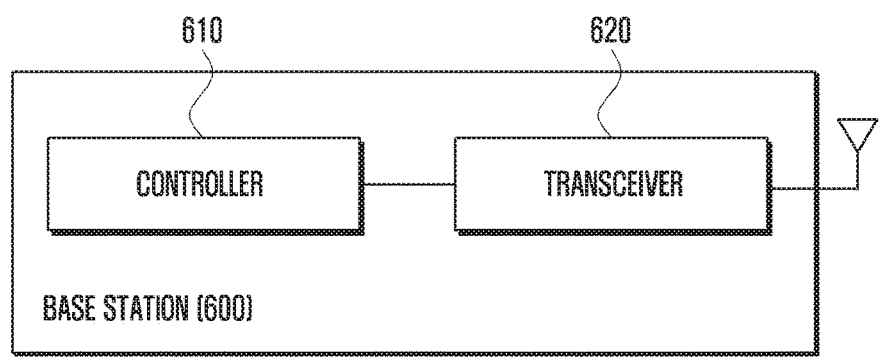
FIG. 6 is a block diagram illustrating the configuration of a base station that can perform the present invention.

FIG. 6 is a block diagram illustrating the configuration of a base station that can perform the present invention.

Referring to FIG. 6, a base station 600 includes a controller 610 and a transceiver 620. The transceiver transmits and receives signals with a terminal. The controller is configured to measure an SIR of the terminal, to determine whether a transmission period is an active period in which data is transmitted or an inactive period otherwise through monitoring of a scheduler, to calculate a data transmission rate in the active period of the terminal if the transmission period is the inactive period, and to determine an offset to be applied to a target SIR based on the data transmission rate of the terminal.

The offset is determined based on received energy per chip divided by a power density in a band (Ec/No) necessary to satisfy the data transmission rate of the terminal. The controller operates to calculate the target SIR value based on the offset, to determine whether the target SIR value is larger than the measured SIR value of the terminal, and to control the transceiver to transmit a TPC command for indicating the terminal to increase the transmission power if the target SIR value is larger than the measured SIR value of the terminal and to transmit a TPC command for indicating the terminal to decrease the transmission power if the target SIR value is not larger than the measured SIR value of the terminal.

Further, the controller operates to determine the target SIR value through outer loop power control if the transmission period is the active period.

Meanwhile, preferred embodiments of the present invention disclosed in this specification and drawings and specific terms used therein are illustrated to present only specific examples in order to clarify the technical contents of the present invention and help understanding of the present invention, but are not intended to limit the scope of the present invention. It will be evident to those skilled in the art that various implementations based on the technical spirit of the present invention are possible in addition to the disclosed embodiments.

The invention claimed is:

1. A method for a base station to control transmission power of a terminal, comprising:
    measuring a signal to interference ratio (SIR) of the terminal;
    determining whether a transmission period is an active period in which data is transmitted or an inactive period otherwise;
    calculating a data transmission rate of the terminal in the active period if the transmission period is the inactive period; and
    determining an offset to be applied to a target SIR based on the data transmission rate of the terminal, the target SIR being decreased based on the offset.

2. The method of claim 1, wherein the offset is determined based on a received energy per chip divided by a power density in a band (Ec/No) necessary to satisfy the data transmission rate of the terminal.

3. The method of claim 1, further comprising:
    calculating a target SIR value based on the offset;
    determining whether the target SIR value is larger than a measured SIR value of the terminal; and
    transmitting a transmit power control (TPC) command for indicating the terminal to increase the transmission power if the target SIR value is larger than the measured SIR value of the terminal, whereas transmitting a TPC command for indicating the terminal to decrease the transmission power if the target SIR value is not larger than the measured SIR value of the terminal.

4. The method of claim 1, further comprising determining a target SIR value through outer loop power control if the transmission period is the active period.

5. A base station for controlling transmission power of a terminal, comprising:
    a transceiver configured to transmit and receive signals with the terminal; and
    at least one processor configured to:
        measure a signal to interference ratio (SIR) of the terminal,
        determine whether a transmission period is an active period in which data is transmitted or an inactive period otherwise,
        calculate a data transmission rate of the terminal in the active period if the transmission period is the inactive period, and
        determine an offset to be applied to a target SIR based on the data transmission rate of the terminal, the target SIR being decreased based on the offset.

6. The base station of claim 5, wherein the offset is determined based on received energy per chip divided by a power density in a band (Ec/No) necessary to satisfy the data transmission rate of the terminal.

7. The base station of claim 5, wherein the at least one processor is further configured to:
    calculate the target SIR value based on the offset,
    determine whether the target SIR value is larger than a measured SIR value of the terminal, and control the transceiver to transmit a transmit power control (TPC) command for indicating the terminal to increase the transmission power if the target SIR value is larger than the measured SIR value of the terminal and to transmit a TPC command for indicating the terminal to decrease the transmission power if the target SIR value is not larger than the measured SIR value of the terminal.

8. The base station of claim 5, wherein the at least one processor is further configured to determine a target SIR value through outer loop power control if the transmission period is the active period.

* * * * *